United States Patent [19]

Albertazzi

[11] B 4,005,528
[45] Feb. 1, 1977

[54] MEASURING DEVICE FOR GAUGING MECHANICAL PIECES IN PARTICULAR PIECES INCLUDING ROTATION SURFACES

[75] Inventor: Gastone Albertazzi, Bologna, Italy

[73] Assignee: Finike Italiana Marposs-Soc. In Accomandita Semplice di Mario Possati & C., Bentivoglio, Italy

[22] Filed: Jan. 14, 1975

[21] Appl. No.: 540,888

[44] Published under the second Trial Voluntary Protest Program on March 30, 1976 as document No. B 540,888.

Related U.S. Application Data

[63] Continuation of Ser. No. 363,258, May 23, 1973.

[30] Foreign Application Priority Data

May 23, 1972 Italy .................................. 3436/72

[52] U.S. Cl. ..................... 33/143 F; 33/147 H;
33/147 N; 33/167; 33/174 Q
[51] Int. Cl.[2] ...................... G01B 5/08; G01B 5/20
[58] Field of Search .......... 33/143 R, 143 F, 143 L,
33/147 M, 147 N, 147 H, 147 E, 148 R, 148
H, 167, 174 Q, 178 R, 178 E, 172 E, 147 R,
147 L

[56] References Cited

UNITED STATES PATENTS

| 1,425,283 | 8/1922 | Pratt | 33/147 H |
|---|---|---|---|
| 2,353,813 | 7/1944 | Deeren | 33/178 E |
| 2,547,719 | 4/1951 | Rosser | 33/174 Q |
| 2,627,119 | 2/1953 | Graham | 33/147 N |
| 2,688,192 | 9/1954 | Mennesson | 33/178 R |
| 2,955,358 | 10/1960 | Walkling | 33/143 F |
| 3,688,411 | 9/1972 | Asano et al. | 33/143 L |
| 3,795,055 | 3/1974 | Zucco | 33/174 Q |
| 3,808,695 | 5/1974 | La Moreux | 33/174 Q |

FOREIGN PATENTS OR APPLICATIONS

| 615,024 | 1/1961 | Italy | 33/178 Q |

Primary Examiner—Houston S. Bell, Jr.
Assistant Examiner—John W. Shepperd
Attorney, Agent, or Firm—Stevens, Davis, Miller & Mosher

[57] ABSTRACT

A measuring device for checking mechanical pieces either while stationary or rotating which includes a first feeler substantially fixed with respect to a support and in alignment with a measuring head having a second feeler and supported by the support, a commutation unit containing a shaft and cams for changing the support and an electrical unit for detecting and visually recording the diameters and geometrical errors. In a first working condition the support of the measuring device can oscillate in order to allow both the first and second feeler to remain in contact with the piece to be gauged. The commutation unit allows for a change from the first working condition for measuring diameters of the work piece through the first and second feelers to a second working condition for measuring geometrical errors of a piece through the second feeler.

6 Claims, 1 Drawing Figure

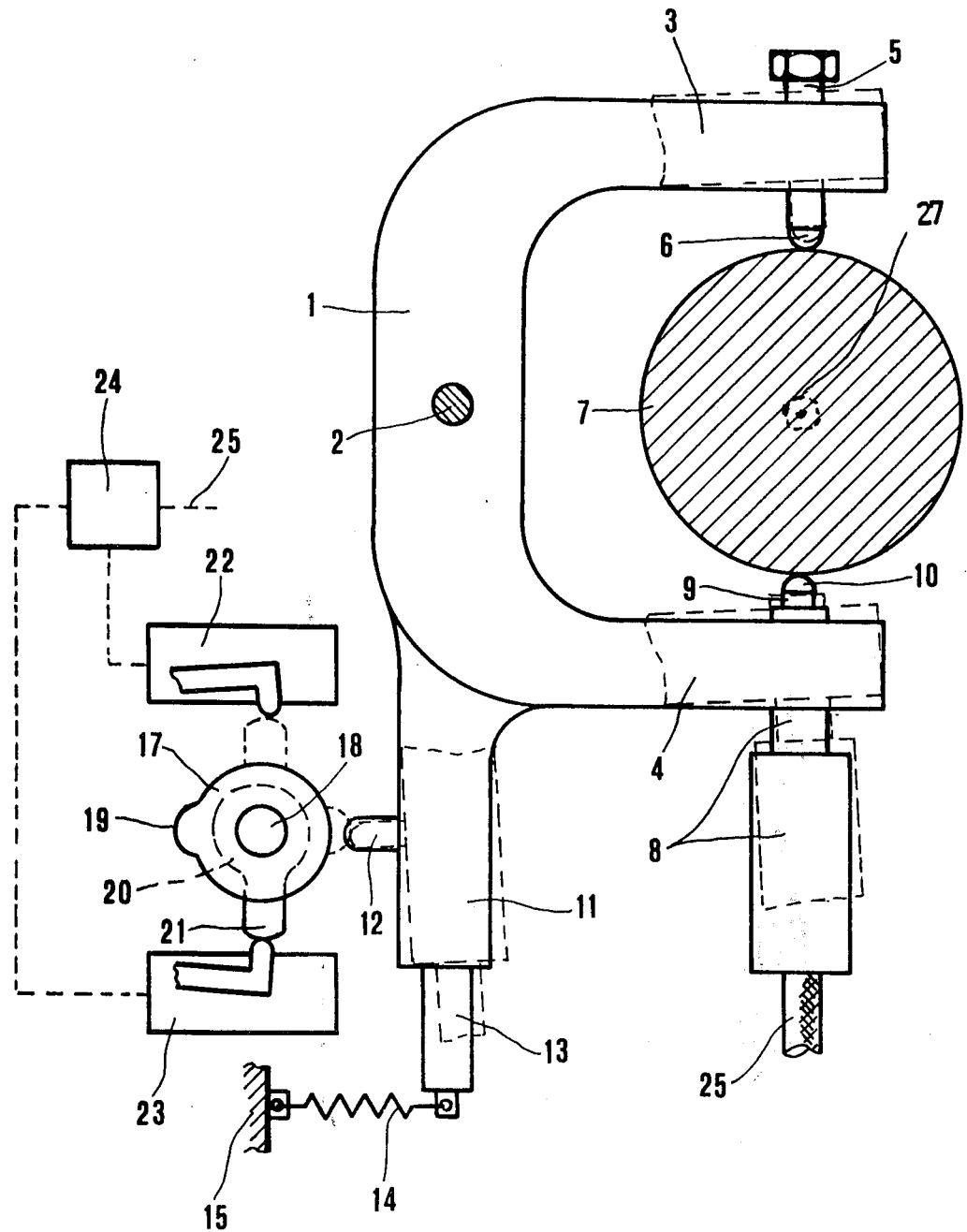

MEASURING DEVICE FOR GAUGING MECHANICAL PIECES IN PARTICULAR PIECES INCLUDING ROTATION SURFACES

This is a continuation of application Ser. No. 363,258, filed May 23, 1973.

The present invention relates to a measuring device for checking mechanical pieces, particularly for measuring the diameter of cylindrical pieces or pieces having cylindrical sections, and the magnitude of the geometric errors of the same pieces while they rotate about an axis, as for instance the eccentricity of one part of the piece with respect to another and the out-of-roundness of a section of the piece. The above-mentioned checks are usually carried out by gauges provided with two measuring heads, each one of which is set to zero on the nominal value of the radius of the piece and whose feelers contact the piece to be checked in two diametrically opposed points.

By means of these gauges it is possible to measure the value of the diameter by adding up the signals of said measuring heads and the geometrical errors, by effecting the difference between two signals, or by observing the variation of only one signal. Other known gauges use only one measuring head set to zero on the value of the radius, whose feeler contacts the piece to be checked in one point, thus indirectly providing the magnitude of the diameter as equal to double the value measured by the measuring head.

The possible deviations in shape are contemporarily detected as changes of the value of the radius, when the piece is rotating.

These gauges, having only one point contacting the piece to be checked, turn out to be inaccurate and therefore scarcely reliable when measuring the value of the diameter.

The above-mentioned gauges with two measuring heads are excessively expensive and their setting to zero is very difficult, owing to the presence of two heads. Moreover, their accuracy, too, is not always sufficient, as the values of the diameter are obtained in an indirect way, by adding up the signals given by the heads.

The technical problem the present invention intends to solve is to provide a measuring device which is simple, exact, not very expensive, highly reliable, able to measure both the diameters of pieces including rotating surfaces and the geometrical errors or, more generally the deviations with respect to a determined value of the same pieces while they revolve about an axis.

This problem is solved by a measuring device for checking pieces including rotating surfaces. This device comprises a first feeler substantially fixed against a support and in alignment with a measuring head having a second feeler and supported, together with the first feeler, by said support. The support of the measuring device oscillate in order to allow both said first and second feeler to remain in contact with the piece to be gauged, when measuring diameters of the pieces. The device also comprises commutation means adapted to allow the commutation of the device itself from a first working condition, for measuring the diameters of the pieces through said first and second feeler, to a second working condition, for measuring geometrical errors of the pieces through said second feeler, while the pieces rotate about.

The following description relates to a preferred embodiment of the present invention, given by way of illustration and not of limitation with the help of the enclosed drawing in which FIG. 1 represents a side view of the device according to the present invention.

With reference to FIG. 1, the device includes a fork-shaped supporting structure 1 pivoted on a pin 2 and provided with two arms 3, 4.

On the end of arm 3 is a feeler 5 which can be screwed through arm 3 and has as an end a ball 6 which forms a first element for contacting piece 7 to be gauged.

Piece 7 is maintained in a position in a way known per se, for example by two centers 27 which allow the piece itself to rotate about a determined axis parallel to pivot 2.

At the end of arm 4 a measuring head 8 is set in an adjustable way, endowed with an axially movable feeler 9 on which there is another ball 10 forming a second element for contacting piece 7.

Feeler 9 is usually pushed axially in a way known per se until ball 10 is brought into contact with piece 7 to be checked. Feelers 5 and 9 are aligned along a line intersecting the rotational axis of piece 7. The rotational axes of pin 2 and piece 7 lie in a plane perpendicular to the aforementioned line.

To structure 1 is connected a third arm 11 with which a lug 12 is integral.

One end of an elastic element, in particular a spring 14, is fixed to stem 13 of arm 11, said spring being connected with frame 15 of the measuring device and being suitable to revolve structure 1 in a clockwise direction, so that ball 6 through a proper pressure is kept in touch with the surface of piece 7, during the measuring of its diameter. In contact with lug 12 is a cam 17 provided with a lobe 19. Cam 17 revolves with shaft 18. Also on shaft 18 is a second cam 20 provided with a lobe 21 adapted to cooperate with two microswitches 22 and 23, which switch on circuits of an electric unit 24 in order to detect and separately visualize the values of the diameter and the radius and/or their deviation with respect to the nominal values, as will be better explained later.

Measuring head 8 is connected with electric unit 24 through cable 25.

To set up the device it is necessary to use a master having the nominal sizes of pieces 7 to be gauged and to adjust measuring head 8 so as to bring ball 10, by a proper pressure, into touch with piece 7.

Then by operating electric unit 24 the condition of electric zero is achieved, i.e., the diameter size of the master is considered as the reference size in a relevant (not shown) indicating instrument of electric unit 24.

The device works as follows.

While lobe 21 of cam 20 is in the position indicated by the continuous line in the FIG. 1, i.e., when lobe 21 presses microswitch 23, the gauge contacts piece 7 both by ball 6 and by ball 10.

So it can exactly gauge the diameter, whose value, i.e., whose deviation with respect to the nominal value, is visualized on the corresponding indicating instrument.

Gauging can be effected even if piece 7 is rotating. As a matter of fact, supporting structure 1 can oscillate around pivot 2 and therefore, by the action of spring 14 ball 6 is always properly in touch with the surface of piece 7.

In order to measure geometrical errors, particularly the deviation in shape relating to the radius of the piece, or the eccentricity with regard to the axis of rotation of the piece, it is necessary to revolve cam 17 so as to bring lobe 19 against lug 12 and lobe 21 against microswitch 22, as shown by dashed lines in FIG. 1.

Lobe 12 pushes lug 12 to the right, thus revolving structure 1 in a counterclockwise direction around pivot 2, so that ball 6 is removed from piece 7.

Under such conditions the contact between lug 12 and lobe 19, and therefore the correct position of structure 1 when measuring the deviation in shape, are still maintained by the action of spring 14.

At the same time microswitch 22, operated by lobe 21, switches over electric unit 24 so that the reference of "electric zero" is displaced onto the new value depending on the fact that the radius, and not the diameter, is now being measured.

Obviously, as electric unit 24 has been already set on the value indicating double the nominal radius, such a displacement of the "zero" reference for the measurement of geometrical errors can be easily carried out automatically.

So the gauge, when piece 7 is revolving, is able to detect the geometrical errors of the piece itself with reference to its radius.

The values of the detected geometrical errors are visualized on a proper indicating instrument of electric unit 24, possibly on the same instrument used to read the diameter. Therefore it is clear that it is possible to measure, by means of the above-described gauge, both diameters and geometrical errors of mechanical pieces including rotating surfaces.

The gauge can be used both for the bench checking of mechanical pieces and for checking pieces during machining, for instance while they are ground.

It is also clear that the gauge can be of a merely mechanical type, with electrical unit 24 and the corresponding commutation means 20–23 omitted and measuring head 8 replaced e.g. by a dial gauge and the like.

Finally the above-described device can undergo other equivalent variations from a functional and structural viewpoint without going beyond the scope of the present invention.

What is claimed is:

1. A measuring device for checking the diameter and the geometrical errors of rotating surfaces of mechanical workpieces supported to rotate about their fixed rotational axis, comprising:
   mounting means defining a fixed rotational axis parallel to the rotational axis of the workpiece to be checked; support means mounted on said mounting means to rotate about said rotational axis defined by said mounting means, said support means being comprised of a first arm and a second arm arranged at opposite sides of said rotational axis defined by said mounting means;
   a first feeler fixed on said first arm of said support means;
   a measuring head fixed on said second arm of said support means, said measuring head comprising a movable second feeler aligned with said first feeler along a line substantially intersecting the rotational axis of the workpiece, said line being substantially perpendicular to the plane defined by said fixed parallel rotational axes;
   a detecting and visualizing unit connected to said measuring head for detecting and visualizing the measurements made;
   resilient means coupled to said support means for urging said first feeler towards the workpiece; mechanical reference means movable in a defined position to mechanically cooperate with said support means to maintain it in a first working position in which said first feeler is apart from the workpiece, and said second feeler is in contact with the workpiece; and
   commutation means connected with said mechanical reference means to displace it from said defined position in which said mechanical reference means maintains said support means in said first working position to a second position in which said support means can oscillate around the rotational axis defined by said mounting means, whereby in said first working position of said support means said measuring head measures the geometrical errors of the workpiece with reference to its rotational axis, while in said second position of said reference means the workpiece is contacted by both said first and second feelers and said measuring head measures the diameter of the workpiece.

2. The device according to Claim 1, in which said support means include a fork-shaped member having said arms carrying said first feeler and said measuring head, respectively; and a third arm having a lug adapted to mechanically cooperate with said reference means to position and block said support means in said first working position.

3. The device according to Claim 2, in which said reference means comprises a first cam coupled to a rotatable shaft of said commutation means.

4. The device according to Claim 3, in which said rotatable shaft carries a second cam for commutation of the detecting and visualizing unit, the detecting and visualizing unit being an electrical unit adapted to detect and visualize the measurement of geometrical errors in said first working condition and measurement of diameter in said second working condition.

5. A measuring device for checking mechanical workpieces supported to rotate about a determined fixed axis, comprising:
   mounting means defining a fixed rotational axis parallel to the rotational axis of the workpiece to be checked; a support mounted on said mounting means rotatable about the rotational axis defined by said mounting means, said support comprising a first arm and a second arm arranged at opposite sides of said rotational axis defined by said mounting means; a first feeler fixed on said first arm of said support;
   a measuring head fixed on said second arm of said support and comprising a movable second feeler aligned with said first feeler along a line substantially intersecting the rotational axis of the workpiece, said line being substantially perpendicular to the plane defined by said determined fixed axis and fixed rotational axis; resilient means coupled to said support for urging said first feeler against the workpiece; an electrical unit connected to said measuring head for detecting and visualizing the measurements made; and
   commutation and reference means comprising first control elements for commutating said support and second control elements for commutating said electrical unit; said first control elements including a mechanical member movable from a first working position, in which said mechanical member contacts said support to maintain it in a position in which said first feeler is apart from the workpiece and said second feeler contacts the workpiece to measure first geometrical features tnereof, to a second working position in which said support can oscillate and both said first and second feelers contact the workpiece to measure second geometrical features thereof; said second control elements being movable to commutate said electrical unit from a first operating condition for measuring and visualizing said first geometrical features to a second operation condition for measuring and visualizing said second geometrical features.

6. The device according to claim 5, in which said first control elements and said second control elements are operatively connected with a single control member adapted to operate simultaneously the first and second elements for commutating said support and commutating said electrical unit.

* * * * *